United States Patent
Kato

(10) Patent No.: US 7,591,205 B2
(45) Date of Patent: Sep. 22, 2009

(54) BALL SCREW AND A METHOD FOR ASSEMBLING THE SAME

(75) Inventor: Masato Kato, Gunma (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 625 days.

(21) Appl. No.: 11/064,840

(22) Filed: Feb. 25, 2005

(65) Prior Publication Data

US 2005/0183530 A1    Aug. 25, 2005

(30) Foreign Application Priority Data

Feb. 25, 2004    (JP) .............................. 2004-049876

(51) Int. Cl.
*F16H 1/24* (2006.01)
*F16H 55/02* (2006.01)

(52) U.S. Cl. ................................. 74/424.87; 74/424.82

(58) Field of Classification Search .............. 74/424.71, 74/484.82, 424.86, 424.87, 89.23
See application file for complete search history.

(56) References Cited

U.S. PATENT DOCUMENTS 5,664,459 A * 9/1997 Muhleck et al. .......... 74/424.87
5,791,192 A * 8/1998 Lee .......................... 74/424.87
6,938,510 B2 * 9/2005 Yabe ........................ 74/424.82
2004/0000208 A1 * 1/2004 Michioka et al. ......... 74/424.86

FOREIGN PATENT DOCUMENTS

DE    42 41 915 A1    7/1993
EP    1 363 046 A2    11/2003
JP    3034052 U       11/1996

OTHER PUBLICATIONS

German Office Action dated Nov. 12, 2008.

* cited by examiner

*Primary Examiner*—Thomas R Hannon
*Assistant Examiner*—Justin Krause
(74) *Attorney, Agent, or Firm*—Sughrue Mion, PLLC

(57) ABSTRACT

A ball screw includes a screw shaft 1, a nut 2 screwed to the screw shaft 1 via balls 3 rollably charged to a ball rolling path 5 in a spiral shape, a ball return path 6 for circulating the ball 3 by delivering the ball 3 from an end point to a start point of the ball rolling path 5, and ball guide member 10 for guiding the ball 3 between the ball rolling path 5 and the ball return path 6. The ball guide member 10 is fitted to a recess portion 15 provided at an end face of the nut 2. An outer edge portion 20*a* of a fixing member 20 is inserted into a groove portion 16 formed at an inner face of the recess portion 15, so that the fixing member 20 fixes the ball guide member 10 to the nut 2.

8 Claims, 5 Drawing Sheets

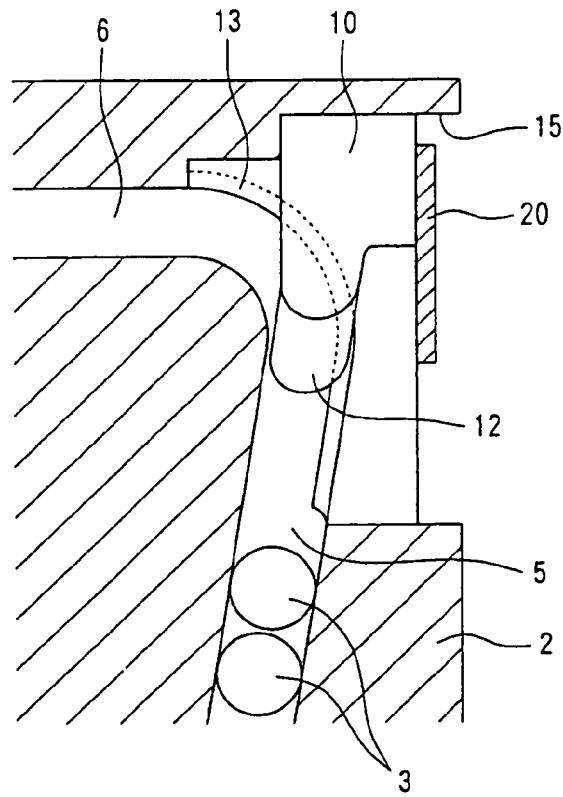
Fig. 5
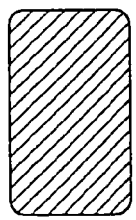 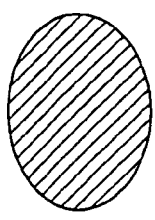 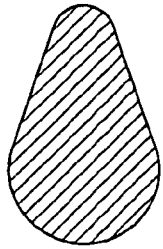 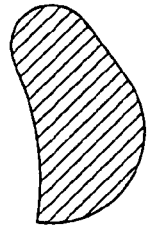 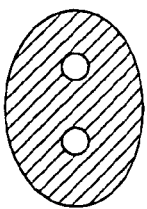
Fig.6(a)  Fig.6(b)  Fig.6(c)  Fig.6(d)  Fig.6(e)

BALL SCREW AND A METHOD FOR ASSEMBLING THE SAME

The present application claims foreign priority under 35 USC 119 based on Japanese Patent Application No. 2004-49876, filed on Feb. 25, 2004, the contents of which is incorporated herein by reference in its entirety, and concurrently with the filing of this U.S. patent application.

BACKGROUND OF THE INVENTION

The present invention relates a ball screw and a method for assembling the same.

A ball screw used in a transfer mechanism, a fine positioning mechanism or the like is constituted by a screw shaft and a nut that is threadedly engaged therewith, and an outer peripheral face of the screw shaft and an inner peripheral face of the nut are provided with screw grooves in a spiral shape opposed to each other. Further, a plurality of balls are rollably charged into a ball rolling path in a spiral shape formed between the two screw grooves, and the screw shaft and the nut are made to be moved relative to each other in an axial direction via rolling of the plurality of balls.

In order to continue relative movement of the screw shaft and the nut, it is necessary to infinitely circulate the ball rolling in the ball rolling path. Therefore, the ball screw is provided with a ball return path for circulating the ball by delivering the ball from an end point to a start point of the ball rolling path. When the ball reaches the end point of the ball rolling path by turning around the screw shaft by a plurality of times while moving in the ball rolling path, the ball is moved from one end portion of the ball return path into the ball return path, passes in the ball return path and is returned from other end portion of the ball return path to the start point of the ball rolling path.

At the end point and the start point of the ball rolling path, the ball is moved between the ball rolling path and the ball return path and in order to smoothly move the ball, there are arranged ball guide members for guiding to move the ball at the end point and the start point of the ball rolling path. Further, the ball guide members are fixed to the nut by various methods.

For example, Japanese Utility Model Number 3034052 describes a ball screw in which a ball guide member is fixed by a spring ring.

However, according to the ball screw described in Japanese Utility Model Number 3034052, an area of bringing the ball guide member into contact with the spring ring constituting a fixing member is small and therefore, when a ball is clogged in a ball rolling path or a ball return path in high acceleration or deceleration or under high load, there is a concern of destructing the spring ring by the ball guide member pressed by the ball.

Further, it is necessary to form a groove having a section in a taper shape for fitting the spring ring to fix to a nut at an inner peripheral face of the nut and therefore, there is a difficulty in machining the nut. Further, in fabricating (integrating) the ball screw, there poses a problem that it is not easy to attach the spring ring to the nut without rattle, or attaching the spring ring thereto by applying a uniform pressure over an entire periphery of the spring ring.

Hence, it is a problem of the invention to resolve the above-described problem provided to the ball screw of the background art and provide a ball screw which is difficult to be broken and easy to fabricate.

SUMMARY OF THE INVENTION

In order to resolve the above-described problem, the invention is constructed by the following constitution. That is, a ball screw according to the invention is characterized in a ball screw including a screw shaft having a screw groove in a spiral shape at an outer peripheral face thereof, a nut having a screw groove opposed to the screw groove of the screw shaft at an inner peripheral face thereof and screwed to the screw shaft via a plurality of balls rollably charged to a ball rolling path in a spiral shape formed by the two screw grooves, a ball return path for circulating the ball by delivering the ball from an end point to a start point of the ball rolling path, and a ball guide member for guiding to move the ball between the ball rolling path and the ball return path, wherein the ball guide member is fixed to the nut by fitting the ball guide member to a recess portion provided at an end face of the nut, thereafter, arranging a fixing member on an exposed portion of the ball guide member and pinching the ball guide member by the fixing member and the nut, and attaching the fixing member to the nut by inserting a portion of the fixing member to a groove portion formed at an inner face of the recess portion. Further, it is preferable that the fixing member is formed into a plate shape.

According to such a constitution, an area of bringing the ball guide member and the fixing member is large and therefore, even when the ball is clogged at the ball rolling path or the ball return path, a possibility of destructing the fixing member by the ball guide member pressed by the ball is low. Further, working the nut and attaching the fixing member are facilitated and therefore, also fabrication of the ball screw is facilitated.

Further, it is preferable that the fixing member is made of a metal. When the fixing member is made of a metal, the fixing member is provided with spring performance and therefore, the ball guide member can be pressed to the nut to fix. As a result, a position of fixing the ball guide member becomes accurate, further, the ball guide member impacted by collision of the ball can firmly be fixed.

Further, a ball screw according to the invention is characterized in a ball screw including a screw shaft having a screw groove in a spiral shape at an outer peripheral face thereof, a nut having a screw groove opposed to the screw groove of the screw shaft and screwed to the screw shaft via a plurality of balls rollingably charged to a ball rolling path in a spiral shape formed by the two screw grooves, a ball return path for circulating the ball by delivering the ball from an end point to a start point of the ball rolling path, and a ball guide member for guiding to move the ball between the ball rolling path and the ball return path, wherein the ball guide member is fixedly attached to the nut by a resin.

According to such a constitution, fixing the ball guide member to the nut is extremely facilitated. Further, a fixing member for fixing the ball guide member to the nut is not needed and thereof, it is not necessary to form a groove or the like for attaching the fixing member to the nut at the nut. Therefore, working the nut is extremely facilitated.

The ball screw of the invention is difficult to be broken and is easy to fabricate.

Further, the above-mentioned problem in the related art can also be solved by a ball screw according to the present invention. The ball screw comprises:

a screw shaft having a screw groove in a spiral shape at an outer peripheral face thereof;

a nut having a screw groove opposed to the screw groove of the screw shaft at an inner peripheral face thereof;

a plurality of balls rotatably disposed in a ball rolling path in a spiral shape that is defined by the screw grooves of the screw shaft and the nut, wherein the nut is provided with a ball return path for circulating the balls by delivering the balls from an end point to a start point of the ball rolling path;

a ball guide member fit to a recess portion provided at an end face of the nut for guiding the balls between the ball rolling path and the ball return path; and a fixing member for fixing the ball guide member to the nut, wherein a portion of the fixing member is inserted to a groove portion formed at an inner face of the recess portion in such a manner that the ball guide member is pinched between the fixing member and the nut.

Furthermore, the above-mentioned problem in the related art can also be solved by a method for assembling a ball screw, according to the present invention that includes:

a screw shaft having a screw groove in a spiral shape at an outer peripheral face thereof;

a nut having a screw groove opposed to the screw groove of the screw shaft at an inner peripheral face thereof;

a plurality of balls rotatably disposed in a ball rolling path in a spiral shape that is defined by the screw grooves of the screw shaft and the nut, wherein the nut is provided with a ball return path for circulating the balls by delivering the balls from an end point to a start point of the ball rolling path;

a ball guide member fit to a recess portion provided at an end face of the nut for guiding the balls between the ball rolling path and the ball return path; and a fixing member for fixing the ball guide member to the nut, the assembling method comprising:

fitting the ball guide member to the recess portion, arranging the fixing member on an exposed portion of the ball guide member thus fitted to the recess portion in the fitting step, and attaching the fixing member to the nut by inserting a portion of the fixing member to the groove portion formed at the inner face of the recess portion, thereby pinching the ball guide member between the fixing member and the nut.

Moreover, the above-mentioned problem in the related art can also be solved by a ball screw according to the present invention. The ball screw comprises:

a screw shaft having a screw groove in a spiral shape at an outer peripheral face thereof;

a nut having a screw groove opposed to the screw groove of the screw shaft at an inner peripheral face thereof;

a plurality of balls rotatably disposed in a ball rolling path in a spiral shape that is defined by the screw grooves of the screw shaft and the nut, wherein the nut is provided with a ball return path for circulating the balls by delivering the balls from an end point to a start point of the ball rolling path; and a ball guide member for guiding the balls between the ball rolling path and the ball return path, wherein the ball guide member is fit by a resin to a recess portion provided at an end face of the nut.

BRIEF DESCRIPTION OF THE DRAWINGS

FIG. 5 is a sectional view taken along a line A-A of FIG. 4.

FIGS. 6(a) to 6(e) illustrate views for explaining a shape of a fixing member.

DETAILED DESCRIPTION OF THE PREFERRED EMBODIMENTS

Figure 1:
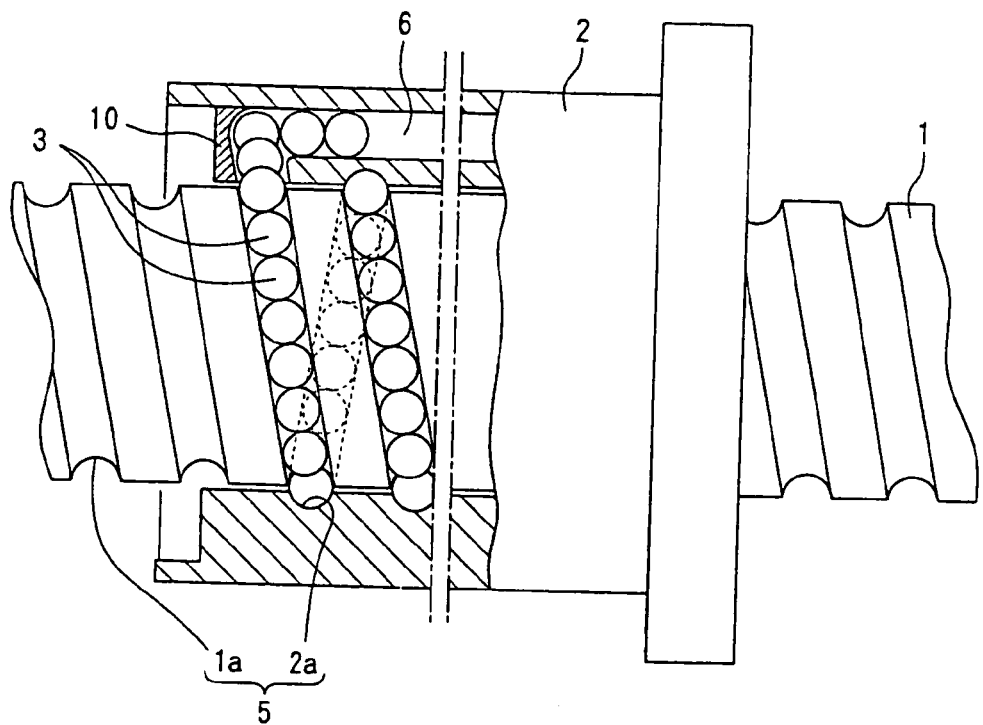
FIG. 1 is a side view breaking to show a portion of a ball screw according to an embodiment of the invention.

An embodiment of a ball screw according to the invention will be explained in details in reference to the drawings. FIG. 1 is a side view of a ball screw according to an embodiment of the invention and a portion thereof is shown by being broken by a plane in parallel with an axial direction.

A ball screw of FIG. 1 includes a screw shaft 1 having a screw groove 1a in a spiral shape at an outer peripheral face thereof, a nut 2 in a cylindrical shape having a screw groove 2a in a spiral shape opposed to the screw groove 1a of the screw shaft 1 at an inner peripheral face thereof and screwed to the screw shaft 1, and a plurality of balls 3 rollably charged to a ball rolling path 5 in a spiral shape formed by the screw groove 1a of the screw shaft 1 and the screw groove 2a of the nut 2. Further, when the nut 2 screwed to the screw shaft 1 via the ball 3 and the screw shaft 1 are moved to rotate relative to each other, the screw shaft 1 and the nut 2 are moved relative to each other in an axial direction via rolling of the ball 3. Further, sectional shapes of the screw grooves 1a, 2a may be a circular arc shape or a gothic arc shape.

Further, the nut 2 is formed with a ball return path 6 comprising a hole extended in the axial direction, and both ends of the ball return path 6 are respectively arranged at vicinities of a start point and an end point of the ball rolling path 5. Therefore, when the ball 3 reaches the end point of the ball rolling path 5 by turning around the screw shaft 1 by a plurality of times while moving in the ball rolling path 5, the ball is moved from one end portion of the ball return path 6 into the ball return path 6, passes in the ball return path 6 and is returned from other end portion of the ball return path 6 to the start point of the ball rolling path 5.

In this way, the ball 3 rolling in the ball rolling path 5 is infinitely circulated by the ball return path 6 and therefore, the screw shaft 1 and the nut 2 can continuously be moved relative to each other.

At the end point of the ball rolling path 5, the ball 3 is moved from the ball rolling path 5 to the ball return path 6, at the start point of the ball rolling path 5, the ball 3 is moved from the ball return path 6 to the ball rolling path 5, and in order to smoothly move the ball 3, the end point and the start point of the ball rolling path 5 are respectively arranged with ball guide members 10, 10 for guiding to move the ball 3 as described above.

Figure 2:
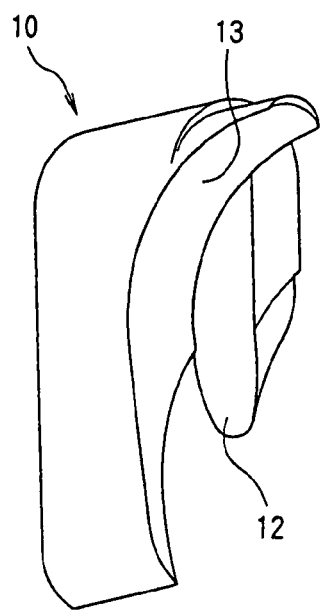
FIG. 2 is a perspective view of a ball guide member.

As shown by FIG. 2, the ball guide member 10 includes a tongue portion 12 for scooping up the ball 3 from the ball rolling path 5 and a guide path 13 for converting a direction of advancing the scooped-up ball 3 to guide to the ball return path 6. The tongue portion 12 is arranged to be along a lead angle and to project into the ball rolling path 5 and therefore, the ball 3 reaching the end point of the ball rolling path by moving in the ball rolling path 5 is scooped up from the ball rolling path 5 by colliding with the tongue portion 12 to shift to the guide path 13 and is moved in the ball return path 6 by being guided by the guide path 13. Further, the ball 3 reaching other end portion of the ball return path 6 by passing in the ball return path 6 is guided by the guide path 13 of the ball guide member 10 arranged at the start point of the ball rolling path 5 and is returned from the ball return path 6 to the start point of the ball rolling path 5.

Figure 3:
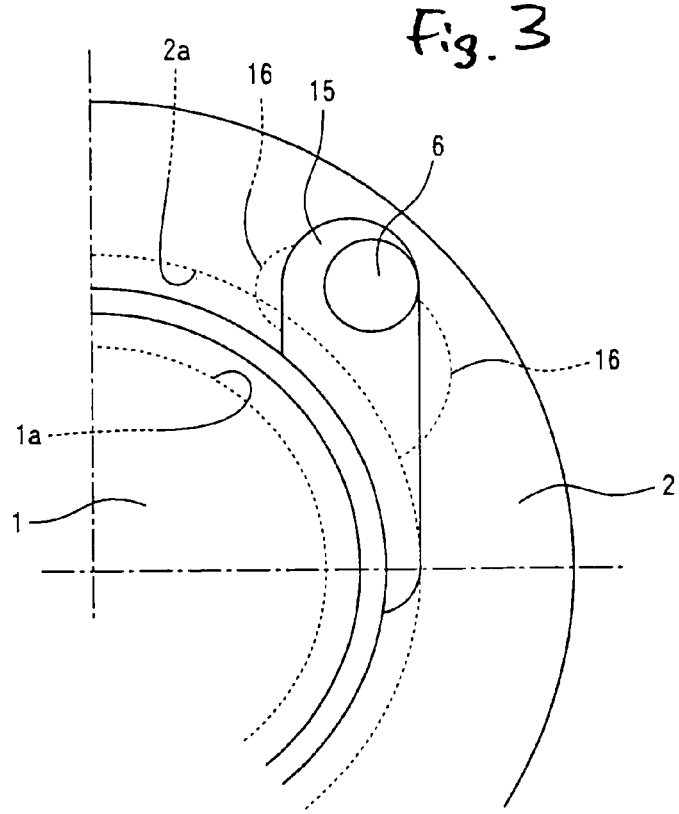
FIG. 3 is a view for explaining a recess portion provided at an end face of a nut.
Figure 4:
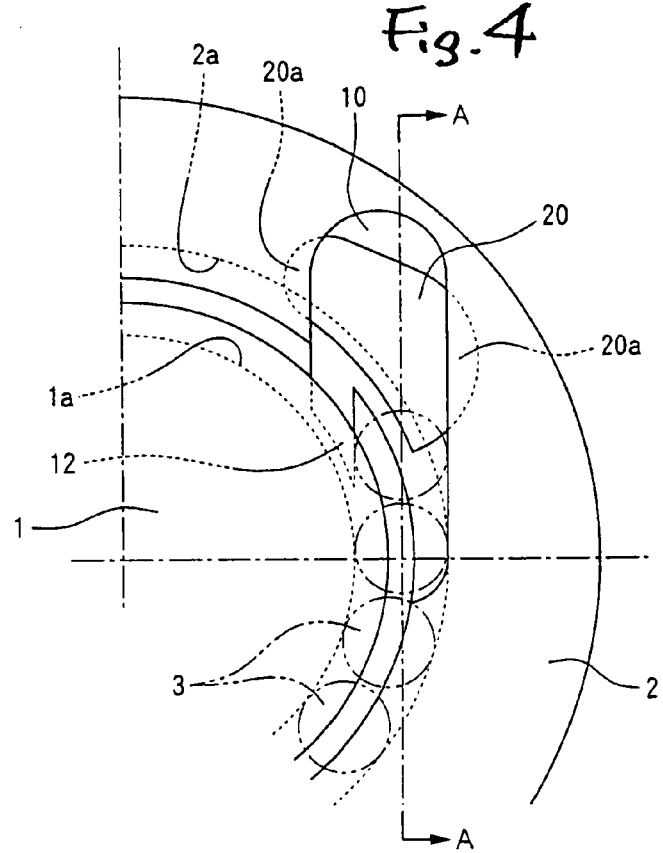
FIG. 4 is a view for explaining a method of fixing a ball guide member to the nut.

The ball guide member 10 is fixed to the nut 2 and a method of fixing the ball guide member 10 to the nut 2 will be explained in details in reference to FIGS. 3 through 5 as follows. FIGS. 3, 4 are views viewing an end face of the nut from the axial direction, FIG. 3 shows a state in which the ball guide member 10 is not fitted to a recess portion 15 and FIG. 4 shows a state in which the ball guide member 10 is fitted to the recess portion 15 and is fixed by a fixing member 20. FIG. 5 is a sectional view taken along a line A-A of FIG. 4.

As shown by FIG. 3, both end faces of the nut 2 in the axial direction are respectively provided with the recess portions 15,15 having a shape matching an outer shape of the ball guide member 10 and end portions of the ball return path 6 are respectively opened to bottom faces of the two recess portions 15, 15. Further, as shown by FIGS. 4, 5, the ball guide member 10 is fitted to the recess portion 15 by directing the tongue portion 12 and the guide path 13 to the bottom shape of the recess portion 15. As described above, the tongue portion 12 is arranged to be along the lead angle and to project into the ball rolling path 5. Further, the guide path 13 is arranged to connect the end point or the start point of the ball rolling path 5 and the end portion of the ball return path 6.

The fixing member 20 is arranged on an exposed portion of the ball guide member 10 fitted to the recess portion 15 (portion exposed to an opening portion of the recess portion 15) and the ball guide member 10 is pinched by the fixing member 20 and the nut 2 (that is, the bottom face of the recess portion 15). A side face of an inner face of the recess portion 15 (face in parallel with the axial direction) is formed with a groove portion 16 capable of inserting an outer edge portion of the fixing member 20, an outer edge portion 20a of the fixing member 20 is inserted into the groove portion 16 and therefore, the fixing member 20 is fixed to the nut 2 to thereby fix the ball guide member 10 to the nut 2.

The direction of advancing the ball 3 is converted by colliding with a vicinity of an inflection point of the guide path 13 curved substantially in a circular arc shape and therefore, it is preferable to arrange the fixing member 20 such that a center of a radius of curvature of the guide path 13 and a center of the fixing member 20 coincide with each other. Thereby, impact loaded to the fixing member 20 by collision of the ball 3 can be alleviated.

Further, although according to the embodiment, the groove portions 16 are formed at two portions of the side faces of the recess portion 15 opposed to each other, the groove portion 16 may be provided at a portion thereof. Although a method of forming the groove portion 16 at the inner face of the recess portion 15 of the nut 2 is not particularly limited, a key seat cutter or the like can be used.

Further, although a shape of the fixing member 20 is not particularly limited so far as the fixing member 20 is provided with a portion insertable to the groove portion 16 and can interpose the ball guide member 10 between the fixing member 20 and the nut 2 to fix, it is preferable that the shape is a plate shape (i.e., a leaf-like shape) in consideration of easiness and firmness of fixing. Although a shape of an outer periphery of the plate-shaped fixing member is not particularly limited, for example, as shown by FIGS. 6(*a*) through (*d*), a substantially rectangular shape, a substantially elliptic shape, a substantially fan-like shape and the like are pointed out. Further, the plate-like fixing member may be provided with a hole as shown by FIG. 6(*b*). When such a hole is provided, the fixing member can be dealt with by engaging a jig for integrating the ball screw to the hole and therefore, an efficiency of operation of integrating the ball screw can be promoted.

Further, a size of the fixing member 20 is not particularly limited but may be a size for covering a total of the exposed portion of the ball guide member 10 or may be a size of covering a portion thereof. However, the larger the area of bringing the ball guide member 10 and the fixing member 20 into contact with each other, the lower the possibility of destructing the fixing member 20 and the more firmly the ball guide member 10 can be fixed and therefore, a large size is preferable.

Further, although a thickness of the fixing member 20 is not particularly limited, in order to prevent the fixing member 20 from being destructed, it is necessary to make the thickness equal to or larger than a predetermined thickness in accordance with severeness of a condition of using the ball 3 of a diameter, a revolutional speed, an acceleration or the like thereof.

Further, it is preferable that the leaf-like fixing member 20 is made of a metal. Thereby, the fixing member 20 is provided with spring performance and therefore, the fixing member 20 can press the ball guide member 10 to the nut 2 to fix. As a result, a position of fixing the ball guide member 10 becomes accurate, further, the ball guide member 10 receiving impact by collision with the ball 3 can firmly be fixed. Although a method of fabricating the fixing member 20 in the leaf-like shape and made of a metal is not particularly limited, the fixing member 20 can be fabricated by a method of electric discharge machining, a wire cut process, punching or the like. However, the plate-shaped fixing member 20 may be made of a resin so far as the resin is provided with high strength and high elasticity to be able to provide spring performance to the fixing member 20. As a kind of the resin, an engineering plastic or the like is preferable and the resin may be included with a reinforcing member of carbon fiber, glass fiber or the like.

Figure 7A:
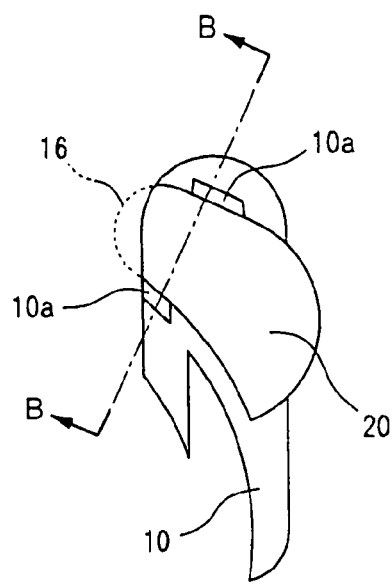
FIGS. 7(a) and 7(b) are views for explaining a projection of holding the fixing member.
Figure 7B:
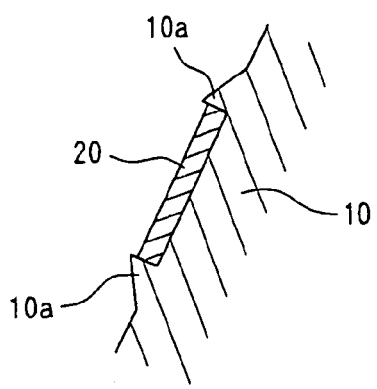

Further, it is preferable to provide a projection 10a for holding the fixing member 20 at the exposed portion of the ball guide member 10 (face brought into contact with the fixing member 20). As shown by FIG. 7 (a) viewing the ball guide member 10 and the fixing member 20 in the axial direction and FIG. 7(*b*) constituting a sectional view taken along a line B-B of FIG. 7(*a*), when at least two pieces of the projections 10a to pinch the fixing member 20 at a position of the fixing member 20 along an outer periphery thereof, the position of the fixing member 20 is not shifted or deviated.

Figure 8A:
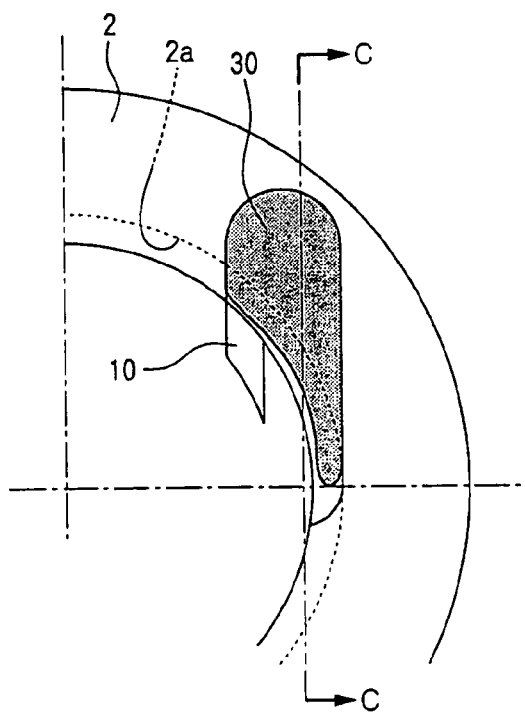
FIGS. 8(a) and 8(b) illustrate views for explaining a method of fixedly attaching the ball guide member to the nut by a resin.
Figure 8B:
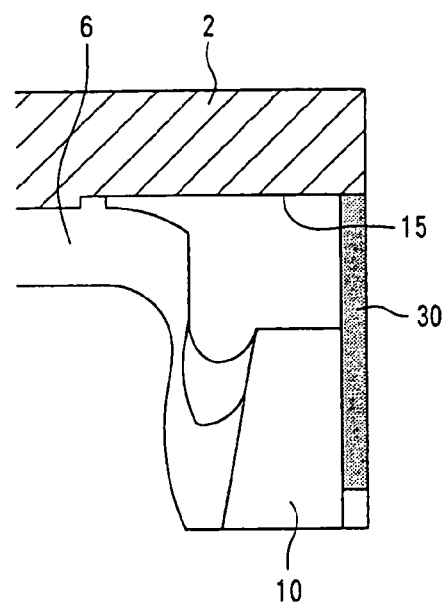
Figure 9:
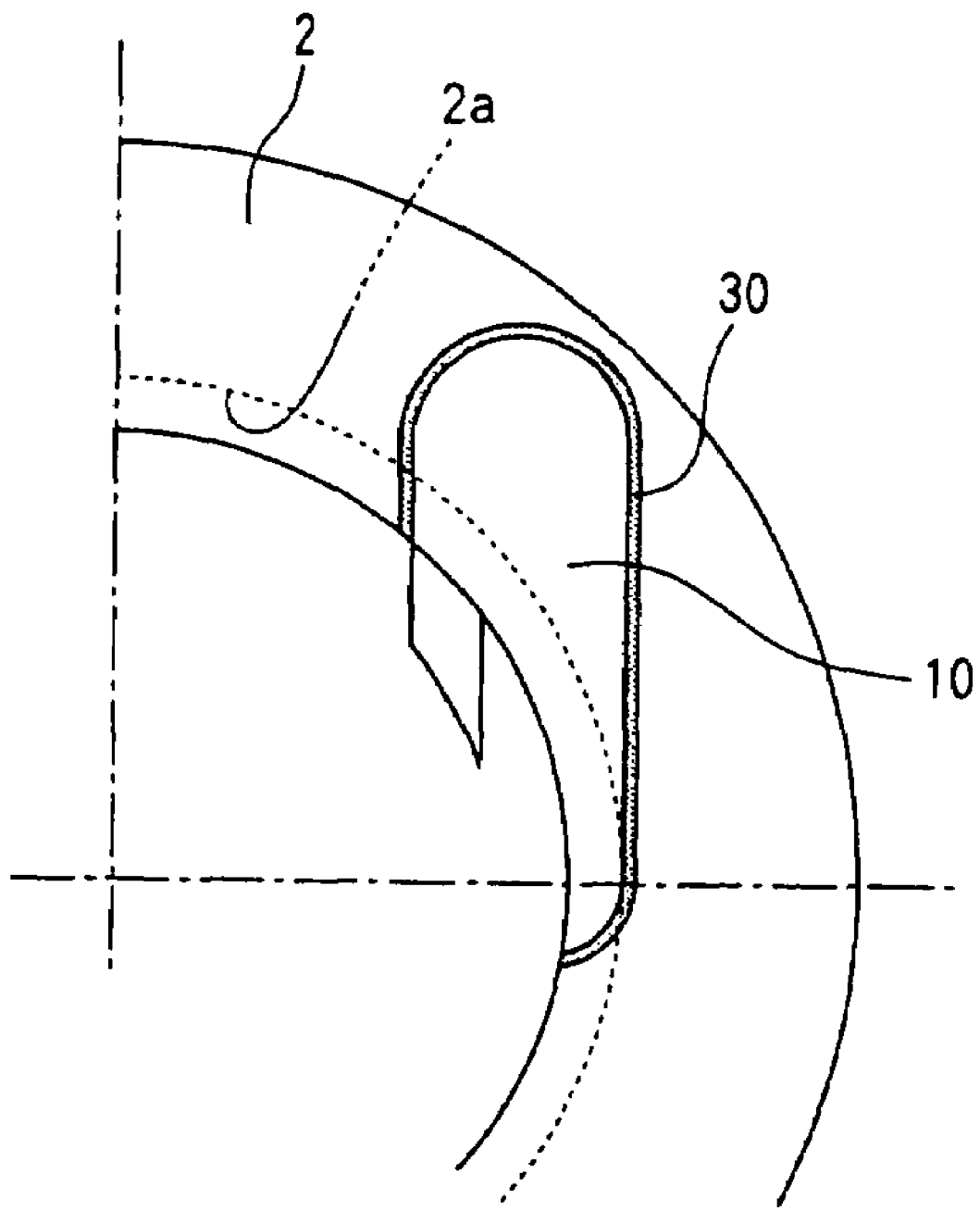
FIG. 9 is a view for explaining a method of fixedly attaching the ball guide member to the nut by the resin.

Further, although according to the embodiment, the ball guide member 10 is fixed to the nut 2 by the fixing member 20, a method of fixedly attaching the ball guide member 10 by a resin may be adopted. For example, as shown by FIG. 8(*a*) viewing the end face of the nut 2 from the axial direction and FIG. 8(*b*) constituting a sectional view taken along a line C-C of FIG. 8(*a*), after fitting the ball guide member 10 to the recess portion 15, a resin 30 in a liquid state of a molten resin, an adhering agent made of a resin or the like may be made to flow into the recess portion 15 to close the opening portion of the recess portion 15 to solidify. Further, as shown by FIG. 9 viewing the end face of the nut 2 from the axial direction, the resin 30 in the liquid state of a molten resin, an adhering agent made of a resin or the like may be interposed between the inner face of the recess portion 15 of the nut 2 and a surface of the ball guide member 10 to solidify. The latter method achieves an effect of restraining sound or vibration brought about when the ball collides with the ball guide member. Further, a kind of the resin is not particularly limited so far as the resin provides a necessary fixing force.

While the invention has been described above with reference to the embodiment, the technical range of the invention is not restricted to the range described in the embodiment. It is apparent to the skilled in the art that various changes or improvements can be made in the embodiment. It is apparent from the appended claims that the embodiment thus changed or improved can also be included in the technical range of the invention.

What is claimed is:

1. A ball screw comprising:
   a screw shaft having a screw groove in a spiral shape at an outer peripheral face thereof;
   a nut having a screw groove opposed to the screw groove of the screw shaft at an inner peripheral face thereof;
   a plurality of balls rotatably disposed in a ball rolling path in a spiral shape that is defined by the screw grooves of the screw shaft and the nut, wherein the nut is provided with a ball return path for circulating the balls by delivering the balls from an end point to a start point of the ball rolling path;
   a ball guide member fit to a recess portion provided at an end face of the nut for guiding the balls between the ball rolling path and the ball return path; and
   a fixing member for fixing the ball guide member to the nut, wherein a portion of the fixing member is inserted to a groove portion formed at an inner face of the recess portion in such a manner that the ball guide member is pressed by the fixing member against the nut, and
   wherein the groove portion extends along only a part of a circumferential direction about a central axis of the nut.

2. The ball screw according to claim 1, wherein the fixing member is a plate shaped member.

3. The ball screw according to claim 2, wherein the fixing member is made of a metal.

4. The ball screw according to claim 1, wherein the fixing member is made of a metal.

5. The ball screw according to claim 1, wherein a cross section of the fixing member is a substantially rectangular shape, a substantially elliptic shape, or a fan shape.

6. The ball screw according to claim 1, wherein the fixing member has a hole.

7. The ball screw according to claim 1, wherein a projection is provided on a face of the ball guide member which is brought into contact with the fixing member, and the projection is configured to position the fixing member with respect to the ball guide member.

8. The ball screw according to claim 1, wherein the ball guide member comprises:
   a tongue portion configured to scoop the balls from the ball rolling path; and
   a guide path configured to guide the balls to the ball return path along an exterior face of the ball guide member.

* * * * *